United States Patent

[11] 3,610,167

| [72] | Inventors | Heinz Hasselmann<br>Hagen;<br>Fred Wiggershaus, Silschede, both of Germany |
|---|---|---|
| [21] | Appl. No. | 861,769 |
| [22] | Filed | Sept. 29, 1969 |
| [45] | Patented | Oct. 5, 1971 |
| [73] | Assignee | Demag-Zug GmbH<br>Wetter am Ruhr, Germany |
| [32] | Priority | Nov. 2, 1968 |
| [33] | | Germany |
| [31] | | P 18 06 681.4 |

[54] TANDEM TROLLEY CARRIAGE
8 Claims, 4 Drawing Figs.

[52] U.S. Cl. .................................................. 105/154,
104/95, 104/98, 105/156
[51] Int. Cl. .................................................. B61b 3/00,
E01b 25/22, E01b 25/26
[50] Field of Search .......................................... 104/95,
100, 101, 98, 102, 96, 104; 105/153, 154, 156

[56] References Cited
UNITED STATES PATENTS

| 1,558,779 | 10/1925 | Bennington | 105/154 |
| 1,624,205 | 4/1927 | Bennington | 105/154 |
| 3,212,452 | 10/1965 | O'Donnell | 104/101 |

*Primary Examiner*—Arthur L. La Point
*Assistant Examiner*—Howard Beltran
*Attorney*—McGlew and Toren ABSTRACT: A carriage for overhead cranes and trolleys, traveling from a first track to a second track which is movable transversely relative to the first track, has at least a pair of wheels, arranged in tandem, at each point of support of the carriage on a track. Wheel-mounting means at each support point connect the wheels at the support point to the carriage and maintain all the tandem wheels at the support point at the same level. Each pair of wheels at the support point is mounted on a common bolt whose axis extends parallel to the direction of travel of the carriage. The bolts may be disposed in a rocker and resilient shock-absorbing means may be associated with the bolts. The spacing between each pair of wheels mounted on a respective bolts is at least equal to the spacing between the two tracks plus the length of the two terminating ramps of the tracks.

PATENTED OCT 5 1971          3,610,167

Inventors
HEINZ HASSELMANN
FRED WIGGERSHAUS

BY

McGlew & Toren
ATTORNEYS

TANDEM TROLLEY CARRIAGE

BACKGROUND OF THE INVENTION

There are known to the art cranes and trolleys in which two load-carrying wheels, or wheel pairs, are mounted in tandem in a rocker. Two rockers are floatingly linked to each end of the crane or trolley. The rockers effect an even load on the load-carrying wheels connected thereto, when there are inaccuracies in the track. In large cranes, two smaller rockers, for the load-carrying wheels, are mounted on a larger rocker.

There are crane installations in which overhead cranes or trolleys transfer from one track to another, with either one or both tracks being movable transversely. There is always a airgap or spacing between the tracks, and this spacing should be kept small so that no severe shocks will occur when the load-carrying wheels transfer from one track to the other. However, if the airgap or space is small, there exists the danger that the gap may become zero due to heat expansion or dislocations. Tracks abutting in flush relation with each other will jam in that position so that none of the tracks can any longer be moved transversely. When the tracks are dislocated relatively to each other due to a change in their length, their aligned end to end travel is no longer possible.

SUMMARY OF THE INVENTION

This invention relates to carriages for overhead cranes and trolleys traveling from one track to another track movable transversely thereto and, more particularly, to a novel arrangement of the load-carrying wheels, or wheel pairs, in tandem at each support point of the carriage on a track.

In accordance with the invention, a carriage for overhead cranes or trolleys is so designed that no shocks will develop in the crane installation when a wide airgap between the adjacent ends of a pair of tracks is traversed by the load-carrying wheels. This problem is solved in that, at each supporting point of the overhead crane, trolley or both on a track, two or more wheels, or wheel pairs, are mounted in tandem and maintained always at the same level. Each of these wheels, or wheel pairs, is so designed as to be capable of carrying the load, to be transferred to the supporting point, for a short period. When the airgap or space between the tracks is traversed, the leading wheel or wheel pair floats under no load across the airgap due to its being maintained always at the same height level. The leading wheel, or wheel pair, becomes load-carrying when the trailing wheel, or wheel pair, floats across the airgap or track space. This avoids the otherwise usual shock to the crane installation.

In accordance with a feature of the invention, two wheels or wheel pairs, at each supporting point are mounted on a common bolt whose longitudinal axis extends parallel to the direction of travel of the carriage. Due to the mounting of the wheels, or wheel pairs, on this volt, a lateral pivoting of the wheel or wheel pairs is made possible for following the track. Additionally, the common bolt decreases the cost of the crane installation.

In accordance with another feature of the invention, the bolts are disposed in a rocker of the overhead crane, trolley or both. This design is chosen when large loads must be transmitted.

As a further feature of the invention, the longitudinal spacing of those wheels mounted to a respective bolt is equal to or greater than the spacing between the adjacent ends of the two tracks plus the length of the terminating ramps or bevels of the track. When this spacing is observed, one of the load-carrying wheels is always engaged with a rail. If the two tracks do not coincide exactly in their height level, the height difference is gently compensated by the terminating or starting ramps or bevels. Thus, shocks in the wheels and wheel bearings are avoided under those conditions also.

The bolts may be spring mounted and, for this purpose, cup- or dish-type springs with short spring travel, are preferred, and are disposed on the frame of the crane or on the rocker. The springs will equalize a difference in the loading of the wheels disposed at the ends of the rocker or at the ends of the overhead crane or trolley when a track is uneven. The same effect can be obtained by mounting the bolts in resilient elements.

An object of the invention is to provide an improved carriage for overhead cranes or trolleys in which no shocks will develop in the crane installation when the supporting wheels transverse a wide gap between the ends of adjacent tracks.

Another object of the invention is to provide such a carriage in which, at each supporting point of the overhead crane or trolley, two or more wheel or wheel pairs are mounted in tandem and maintained constantly at the same level.

A further object of the invention is to provide such a carriage in which each wheel or wheel pair is designed so as to be capable of carrying the load for a short period.

Another object of the invention is to provide such a carriage in which two wheels, or two wheel pairs, at each supporting point are mounted on a common bolt whose longitudinal axis is disposed parallel to the travel direction.

A further object of the invention is to provide such a carriage in which the bolts are disposed in a rocker of the overhead crane or trolley.

Another object of the invention is to provide such a carriage in which the longitudinal spacing of those wheels mounted on one bolt is equal to or greater than the spacing between the ends of the track plus the lengths of the starting bevels or ramps.

Another object of the invention is to provide such a carriage in which the bolts are spring mounted or mounted in resilient elements.

For an understanding of the principles of the invention, reference is made to the following description of typical embodiments thereof as illustrated in the accompanying drawings.

DESCRIPTION OF THE PREFERRED EMBODIMENTS

Figure 1:
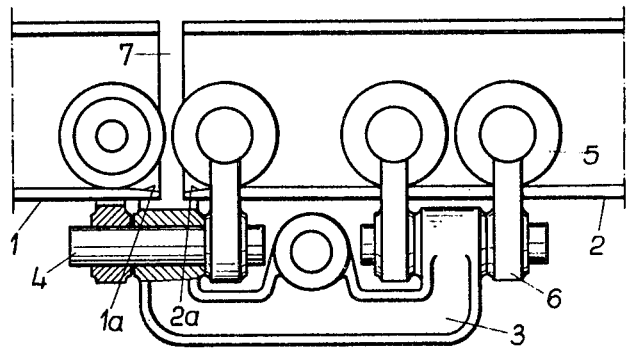
FIG. 1 is a side elevation view, partly in section, illustrating two tracks having a space between their adjacent end and supporting a rocker carriage.

Referring to FIG. 1, a pair of tracks 1 and 2, which are arranged in end-to-end relation and which are further arranged to be moved laterally relative to each other in a known manner, are separated by an airgap 7 between their adjacent ends. The support surface of each rail 1 and 2 has, extending from its end adjacent airgap 7, a starting or terminating ramp or bevel 1a or 2a, respectively.

In this embodiment of the invention, bolts 4 are disposed at the ends of a rocker 3 of an overhead crane, and with their longitudinal axes extending parallel to the direction of travel or parallel to the rails 1 and 2. Through the medium of wheel holders 6, load-carrying wheels 5 are floatingly mounted on bolts 4, there being a pair of wheels 5 in tandem on each bolt 4. Thus, the wheels 5, through the medium of wheel holders 6, can pivot about the axis of the associated bolts 4 to accommodate the irregularities in the support surfaces of tracks 1 and 2.

By virtue of the described arrangement, when the leading or left-hand wheel 5 on the leading bolt 4 reaches the airgap 7 it will float across this airgap while the load is supported by the second or trailing wheel 5, as bolts 4 maintain the associated wheels 5 constantly at the same height level. As the left-hand wheel 5 engages the support surface of track 1, it assumes the whole load at that end of rocker 3 while the next wheel 5 floats across the gap 7. Thus, shocks to the wheel bearings or to the crane installation, while support wheels 5 travel across airgap 7 from track 2 to track 1, or vice versa, are avoided.

Figure 2:
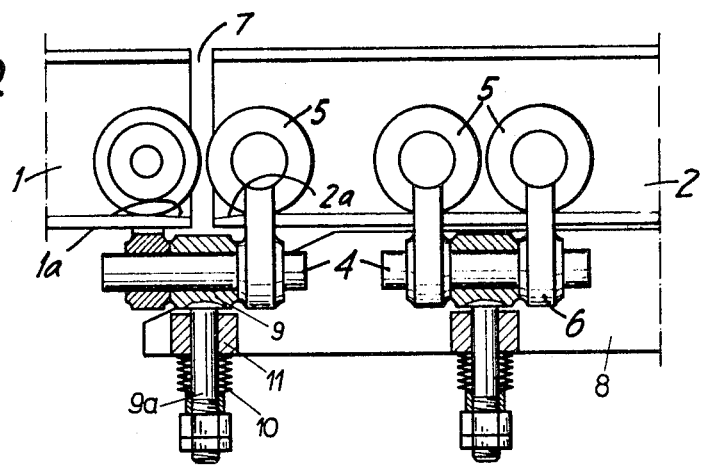
FIG. 2 is a side elevation view, partly in section, illustrating two spring-carriage arrangements at one end of an overhead crane head support.

Referring to FIG. 2, an overhead crane head support 8 carries journals 9a for bearings 9 for bolts 4. Each bolt 4 has secured thereto support wheels 5 through the medium of wheel holders 6 in the same manner as in FIG. 1. Journals 9a are supported through the medium of cup or dish type springs 10 engaged with the respective guide bushings 11 of head support 8. Guide bushings 11 are sufficiently long and have sufficiently small tolerances with respect to journals 9a as to make a twisting of bolts 4 and, hence, a mounting of load-carrying wheels 5 at different levels, impossible. The arrangement of FIG. 2 operates in the same manner as the arrangement of FIG. 1 during travel of the support wheels across the airgap 7 between tracks 1 and 2.

Figure 4:
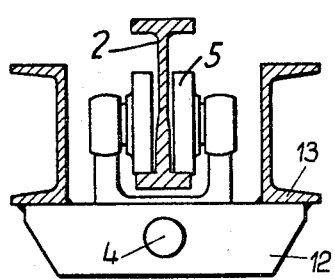
FIG. 4 is a sectional view taken on the line IV—IV of FIG. 3.
Figure 3:
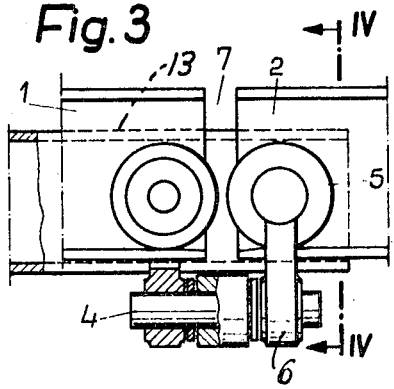
FIG. 3 is a side elevation view, partly in section, of two tracks, having their ends spaced from each other, being traversed by a single carriage part.

FIGS. 3 and 4 illustrate an embodiment of the invention in which each bolt 4 is mounted in a crossbeam 12 of an overhead trolley frame 13, with the longitudinal axis of each bolt 4 extending parallel to the direction of travel of the trolley frame. It will be noted that the support wheels 5 are arranged as axially aligned in pairs each engaged with a track flange on respective opposite sides of the track web. The same holds true for the embodiments of the invention shown in FIGS. 1 and 2.

While specific embodiments of the invention have been described in detail to illustrate the application of the principles of the invention, it will be understood that the invention may be embodied otherwise without departing from such principles.

What is claimed is:

1. A carriage for overhead cranes and trolleys, traveling from a first track to a second track, with adjacent ends of the tracks being separated by an airgap, said carriage comprising, in combination, at least a pair of wheels, arranged in tandem, at each point of support of said carriage on a track and aligned longitudinally of the tracks; wheel mounting means at each support point interconnecting all the wheels at the respective support point and extending longitudinally of the tracks; and means securing each wheel mounting means to said carriage against swinging movement in a vertical plane to maintain all the tandem wheels at the respective support point at the same level and against relative displacement in a vertical plane.

2. A carriage for overhead cranes and trolleys, as in claim 1, including a common bolt at each support point secured to the carriage with its longitudinal axis extending parallel to the direction of travel; all of the tandem wheels at the respective support point being mounted on said common bolt.

3. A carriage for overhead cranes and trolleys, as in claim 2, in which each wheel at a respective support point is mounted in a holder; said holders being mounted on the associated bolt for swinging about the axis of the associated bolt.

4. A carriage for overhead cranes and trolleys, as in claim 2, in which said carriage comprises a rocker of the overhead crane or trolley, said common bolts being mounted in said rocker.

5. A carriage for overhead cranes and trolleys, as in claim 2, and which said tracks have sloping ramps at their adjacent ends; the spacing of wheels mounted on one bolt being at least equal to the spacing between the ends of the tracks plus the lengths of said ramps.

6. A carriage for overhead cranes and trolleys, as in claim 2, including resilient means mounting said common bolts.

7. A carriage for overhead cranes and trolleys, as in claim 2, which said carriage includes guide bushings; journals supported in said guide bushing; bearings for said common bolts each supported on a respective journal; and dish-type springs interposed between each guide bushing and an abutment on the associated journal.

8. A carriage for overhead cranes and trolleys, as in claim 2, in which said carriage includes a crossbeam extending transversely beneath said tracks; each common bolt being mounted in said crossbeam.